United States Patent
Saeki et al.

(10) Patent No.: US 12,319,378 B2
(45) Date of Patent: Jun. 3, 2025

(54) STRADDLE VEHICLE AND LIGHT CONTROL METHOD THEREOF

(71) Applicant: KAWASAKI MOTORS, LTD., Akashi (JP)

(72) Inventors: Daisuke Saeki, Akashi (JP); Hiroaki Amano, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 595 days.

(21) Appl. No.: 17/455,132

(22) Filed: Nov. 16, 2021

(65) Prior Publication Data

US 2022/0153374 A1 May 19, 2022

(30) Foreign Application Priority Data

Nov. 16, 2020 (JP) .................................. 2020-189969

(51) Int. Cl.
*B62J 6/024* (2020.01)
*B62J 45/20* (2020.01)
*B62J 50/22* (2020.01)

(52) U.S. Cl.
CPC .............. *B62J 6/024* (2020.02); *B62J 45/20* (2020.02); *B62J 50/22* (2020.02)

(58) Field of Classification Search
CPC ...................................................... B62J 6/024
See application file for complete search history.

(56) References Cited

U.S. PATENT DOCUMENTS

2008/0294315 A1* 11/2008 Breed ..................... G01S 17/88
  701/49
2016/0081171 A1* 3/2016 Ichikawa ............... H05B 47/25
  315/77

(Continued)

FOREIGN PATENT DOCUMENTS

EP     3150434 A1 *  4/2017
JP     S52136576      10/1977

(Continued)

OTHER PUBLICATIONS

Google Machine Translation of European Patent Pub. No. EP2641780B1 to Ikeda.*

(Continued)

*Primary Examiner* — Jean Paul Cass
(74) *Attorney, Agent, or Firm* — Fay Kaplun & Marcin, LLP

(57) ABSTRACT

An operation member is switchable between a first operation position, a second operation position, and a third operation position. When operating force is released while the operation member is at the third operation position, the operation member returns to the second operation position. The controller is switchable between a first mode and a second mode. In the first mode, the controller sets the headlight to high beam when the operation member is at the first operation position or the third operation position, and sets the headlight to low beam when the operation member is at the second operation position. In the second mode, the controller controls to change an illumination mode by the light according to a situation acquired by the situation acquisition unit. The switching from the first mode to the second mode is performed by holding the operation member at the third operation position for a first threshold time or more.

11 Claims, 7 Drawing Sheets

(56) References Cited

U.S. PATENT DOCUMENTS

2020/0070915 A1\* 3/2020 Matthey .................. B60Q 1/10
2020/0298922 A1\* 9/2020 Saeki ...................... B62J 6/024

FOREIGN PATENT DOCUMENTS

| | | | |
|---|---|---|---|
| JP | 2013032123 A | \* | 2/2013 |
| JP | 2016074246 A1 | | 5/2016 |
| KR | 200326978 Y1 | \* | 5/2003 |

OTHER PUBLICATIONS

Google Machine Translation of Japanese Patent Pub. No. JP2013032123A to Yamada that was filed in 2011.\*
Google Machine Translation of Korean Patent Application Pub. No. KR200326978Y1 that was filed in 2003.\*

\* cited by examiner

FIG. 5 in manual mode

| switching lever | P1 | P2 | P3 |
|---|---|---|---|
| headlight | high beam | low beam | high beam |
| display of meter | (no display) | (no display) | (no display) | in automatic mode

| switching lever | P1 | P2 | P3 |
|---|---|---|---|
| headlight | (auto) | low beam | high beam |
| display of meter | appearance mode D2 | appearance mode D1 | appearance mode D1 |

STRADDLE VEHICLE AND LIGHT CONTROL METHOD THEREOF

CROSS-REFERENCE TO RELATED APPLICATIONS

The present application claims priority to JP Patent Application Serial. No. 2020-189969 filed Nov. 16, 2020 which is incorporated herein by reference.

TECHNICAL FIELD

The present disclosure relates to a straddle vehicle and a light control method thereof.

BACKGROUND ART

The straddle vehicle of PTL 1 is configured so that a headlight is switched between high beam and low beam by a driver performing predetermined operation on a handlebar switch device.

PRIOR-ART DOCUMENTS

Patent Documents

PTL 1: Japanese Unexamined Patent Application Publication No. 2016-74246

SUMMARY

In PTL 1, when changing light illumination mode other than switching between high beam and low beam, the mode switching operation becomes complicated.

The present disclosure relates to the mode switching operation relating to the illumination mode of the light.

In a first aspect of the present disclosure, a straddle vehicle having the following configuration is provided. That is, the straddle vehicle includes a light, a situation acquisition unit, a controller, and an operation member. The light has a headlight. The situation acquisition unit acquires a situation of the vehicle. The controller controls illumination by the light. The operation member is operable to indicate an optical axis angle of the headlight. The operation member is switchable between a first operation position, a second operation position, and a third operation position. When operating force is released while the operation member is at the first operation position, the operation member is held at the first operation position. When operating force is released while the operation member is at the second operation position, the operation member is held at the second operation position. When operating force is released while the operation member is at the third operation position, the operation member returns to the second operation position. The controller is switchable between a first mode and a second mode. In the first mode, the controller sets the headlight to high beam when the operation member is at any of the first operation position and the third operation position, and sets the headlight to low beam when the operation member is at the second operation position. In the second mode, the controller controls to change an illumination mode by the light according to the situation acquired by the situation acquisition unit. The switching from the first mode to the second mode is performed by holding the operation member at the third operation position for a first threshold time or more.

This allows simple operation of holding the operation member at the third operation position for a predetermined time to instruct the controller to switch to the second mode using a simple operation member having three operation positions. This is suitable for a straddle vehicle where simplicity of operation is strongly required.

In a second aspect of the present disclosure, a light control method for a straddle vehicle as follows is provided. That is, in this light control method for the straddle vehicle, the straddle vehicle includes a retarder-type passing switch. The light control method includes a determination step and a mode switching step. In the determination step, it is determined whether a predetermined switching condition including operation of the passing switch is satisfied. In the mode switching step, a mode set for the light is switched according to a result of the determination of the determination step.

This enables the mode set for the light to be switched. And, the configuration for switching the mode can be simplified.

According to the present disclosure, it is possible to switch mode related to the illumination mode of the light, and to simplify the switching of the mode.

BRIEF DESCRIPTION OF THE DRAWINGS

FIG. 5 is a diagram illustrating a control of a display of a meter device.

DETAILED DESCRIPTION

Figure 1:
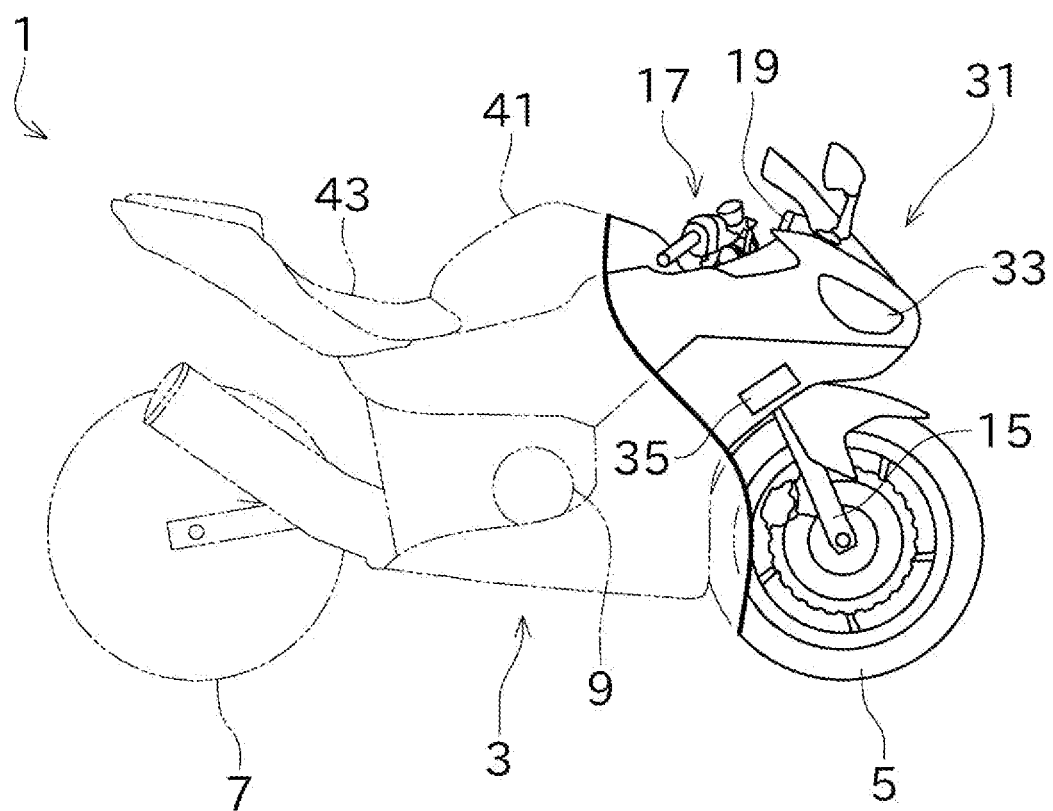
FIG. 1 is a side view of a motorcycle in accordance with an embodiment of the present disclosure.
Figure 2:
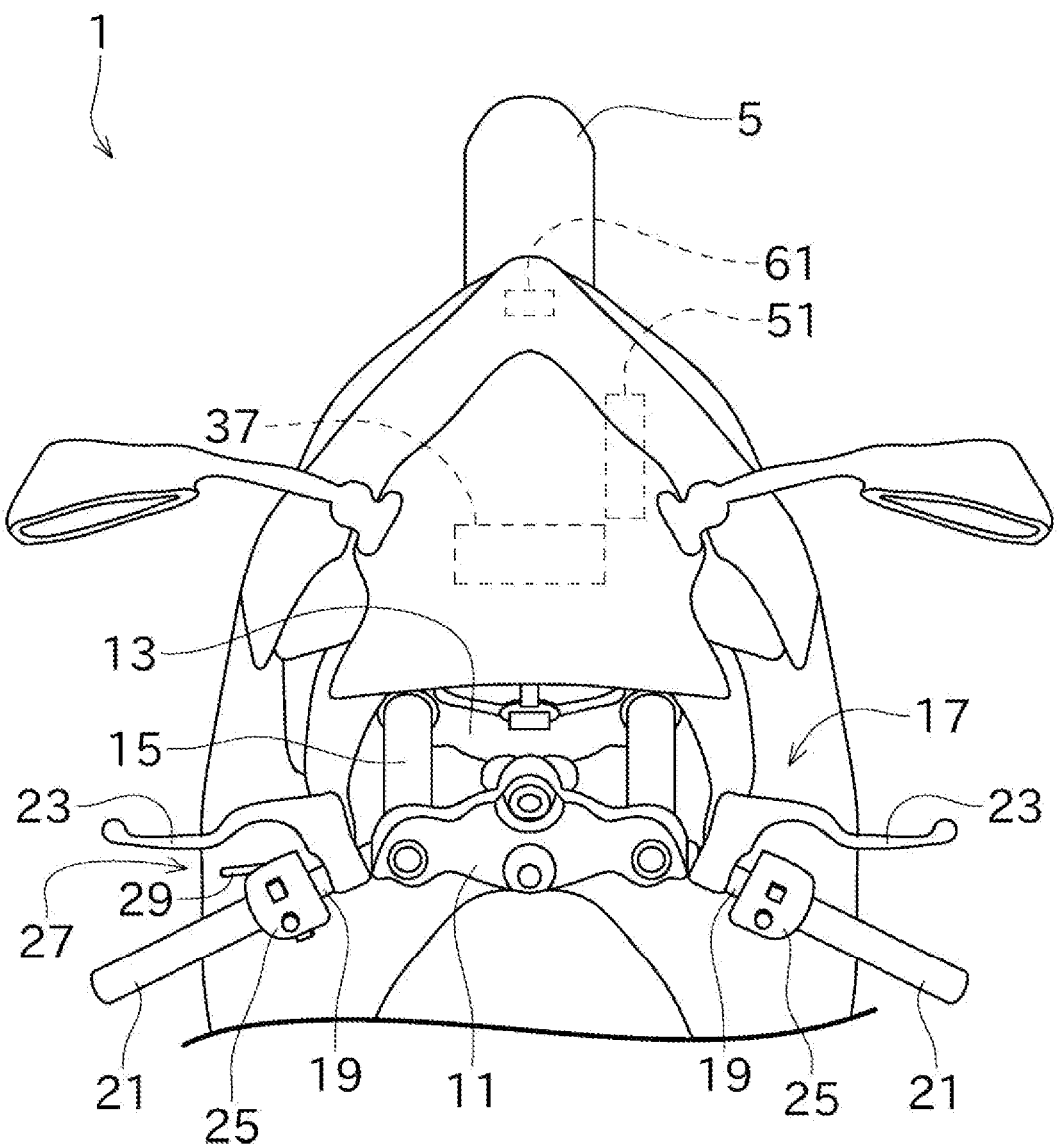
FIG. 2 is a plan view of a front part of the motorcycle.

With reference to the drawings, an embodiment disclosed will be described. Initially, referring to FIGS. 1 and 2, an overview of a motorcycle 1 according to an embodiment of the present disclosure will be described. FIG. 1 is a side view of the motorcycle 1. FIG. 2 is a plan view of a front part of the motorcycle 1. The motorcycle 1 is an example of a straddle vehicle.

In the following description, the direction of the motorcycle 1 is defined based on the view from a rider riding the motorcycle 1. Accordingly, the front-rear direction corresponds to a vehicle length direction of the motorcycle 1, and the left-right direction corresponds to a vehicle width direction of the motorcycle 1.

As shown in FIG. 1, the motorcycle 1 includes a vehicle body 3, a front wheel 5, and a rear wheel 7.

An engine 9 is provided in vicinity of a center in the front-rear direction of the vehicle body 3. The engine 9 is a drive source for driving the motorcycle 1. The drive source is a gasoline engine in this embodiment. The drive source is not particularly limited and may be, for example, an electric motor for driving. The power generated by the engine 9 is transmitted to the rear wheel 7 via a drive chain or the like. This makes it possible to drive the motorcycle 1.

A front fork 15 is attached at the front part of the vehicle body 3 via an upper bracket 11, a lower bracket 13, and the like shown in FIG. 2. The front fork 15 is disposed in a pair of left and right so as to sandwich the front wheel 5 viewed from the front. A handle unit 17 is disposed near an upper end of the front fork 15. The operation of the handle unit 17 by a driver make the front fork 15 rotates. As a result, a traveling direction of the motorcycle 1 can be changed.

As shown in FIG. 2, the handle unit 17 includes a handle bar 19. The handle bar 19 is attached to at least one of the upper bracket 11 and the front fork 15. In the present embodiment, the two handle bars 19 comprises a left handle bar 19 and a right handle bar 19. The left and right handle bars 19 are disposed separately on left and right with respect to the upper bracket 11 in the vehicle width direction. A single handle bar may be used as the handle bar 19, which is arranged so as to extend in the vehicle width direction relative to the upper bracket 11.

The left and right pairs of handle bars 19 are each provided with a grip 21, a lever 23, and a handle switch 25. The grip 21 on the right side is a rotation type throttle grip. The lever 23 on the left side is a clutch lever. The lever 23 on the right side is a brake lever. The handle switch 25 of the left side is provided with a light operation unit 27. The driver can use the light operation unit 27 to perform operation related to illumination of a light 31 provided on the motorcycle 1 (in particular, irradiation of a headlight 33).

In addition to the light operation unit 27, the handle switch 25 on the left side may further include a turn signal lamp operation unit for operating a turn signal lamp, a horn operation unit for operating a horn, a hazard lamp operation unit for simultaneously irradiating the left and right turn signal lamps, and the like. The handle switch 25 of the right side may be provided with, for example, an engine start operation unit for starting the engine, a multi-function operation unit to which a function can be assigned by the driver, or the like.

The light 31 includes a headlight 33. In this embodiment, the light 31 further includes cornering light 35. With respect to the light operation unit 27, the driver can perform operation to switch the irradiation mode of the headlight 33 between high beam and low beam, passing operation to perform passing, and mode switching operation.

The light operation unit 27 includes a switching lever (operation member) 29. The switching lever 29 can indicate the angle of the optical axis of the headlight 33. The switching lever 29 is disposed near the grip 21 on the left side. This allows the driver to operate the switching lever 29 when the motorcycle 1 is running.

The headlight 33 is provided at the front end of the vehicle body 3 so that it can irradiate forward of the motorcycle 1. A light source of the headlight 33 is, for example, a HID (High-Intensity Discharge) lamp or a light emitting diode (LED). The headlight 33 may be provided in a pair on the left and right sides as in the present embodiment, or may be provided only in the central portion in the vehicle width direction. Further, the number of headlights 33 can be changed as desired.

The headlight 33 can switch their irradiation mode between low beam and high beam. The switching between low beam and high beam may be realized using a common light source, or by a light source dedicated to low beam and a light source dedicated to high beam.

Low beam refers to the mode in which the headlight 33 irradiates near or slightly ahead of the front wheel 5. High beam refers to the mode in which the headlight 33 irradiates forward to a position farther from the front wheel 5 than in low beam. Low beam and high beam are switched by substantially changing the direction of the optical axis of the headlight 33.

Cornering light 35 is provided on each of the left and right sides of the vehicle body 3. The light source of the cornering light 35 is, for example, an HID lamp or a light emitting diode (LED). The cornering light 35 can illuminate the inside of the turning direction of the vehicle body 3 when the motorcycle 1 turns. The cornering light 35 may be omitted.

A meter device 37 is disposed in front of the handle unit 17 and is near the center of the vehicle width direction. The meter device 37 can display information about the motorcycle 1. The information can include, for example, the current engine speed, vehicle speed, and irradiation mode of the light 31 (irradiation mode of the headlight 33). The meter device 37 includes a key or a touch panel. By operating the keys or the touch panel, settings related to the motorcycle 1 can be changed. Switching between a manual mode and an automatic mode, as described below, can also be performed by selecting a menu (not shown) displayed in the display of the meter device 37.

A fuel tank 41 is disposed behind the handle unit 17 and above the engine 9. Fuel is stored in the fuel tank 41 for supply to the engine 9. A front seat 43 for the driver to straddle and sit on when riding is disposed behind the fuel tank 41.

Figure 3:
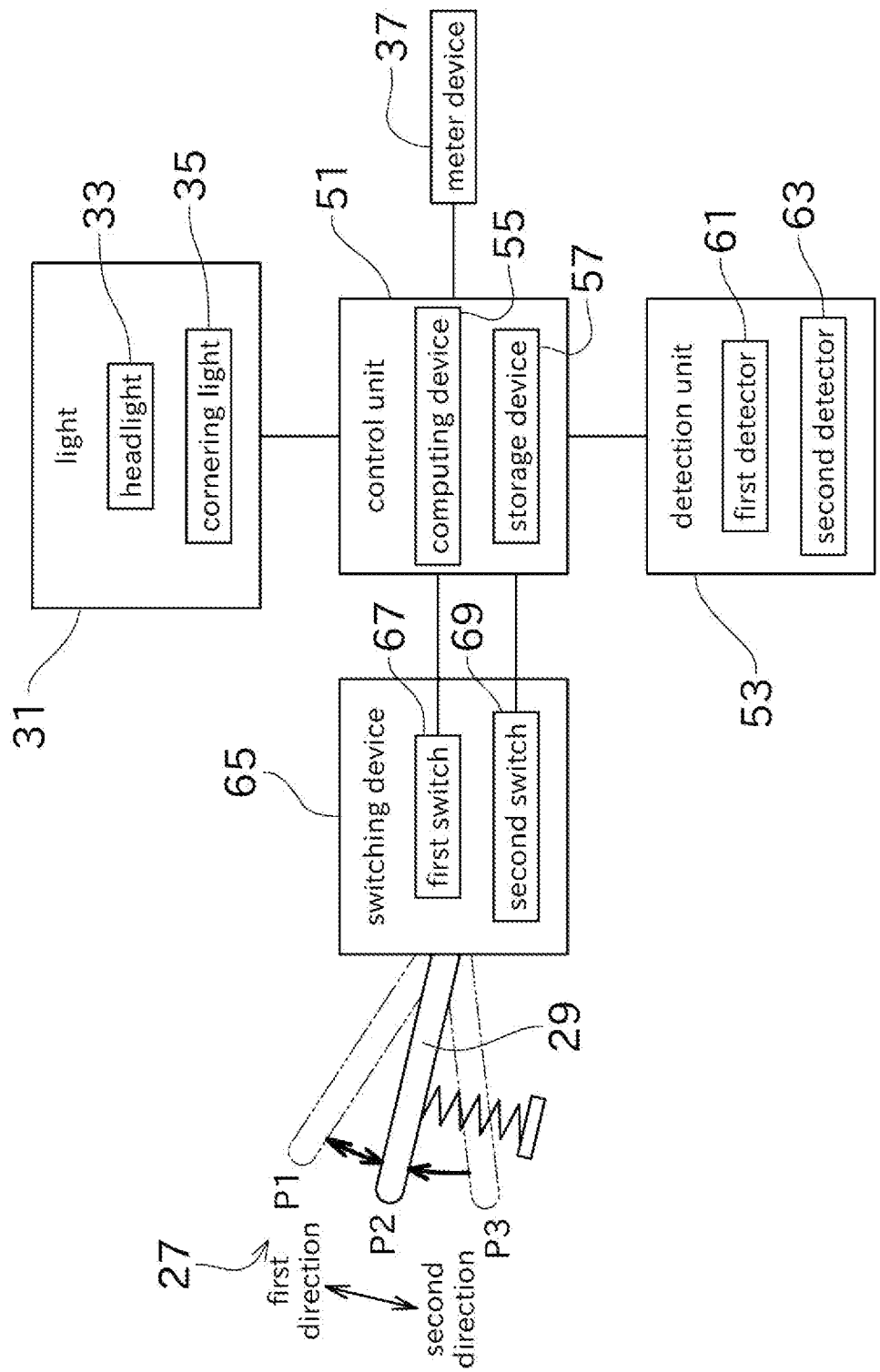
FIG. 3 is a block diagram showing an electrical configuration for changing an illumination mode of a light.
Figure 4:
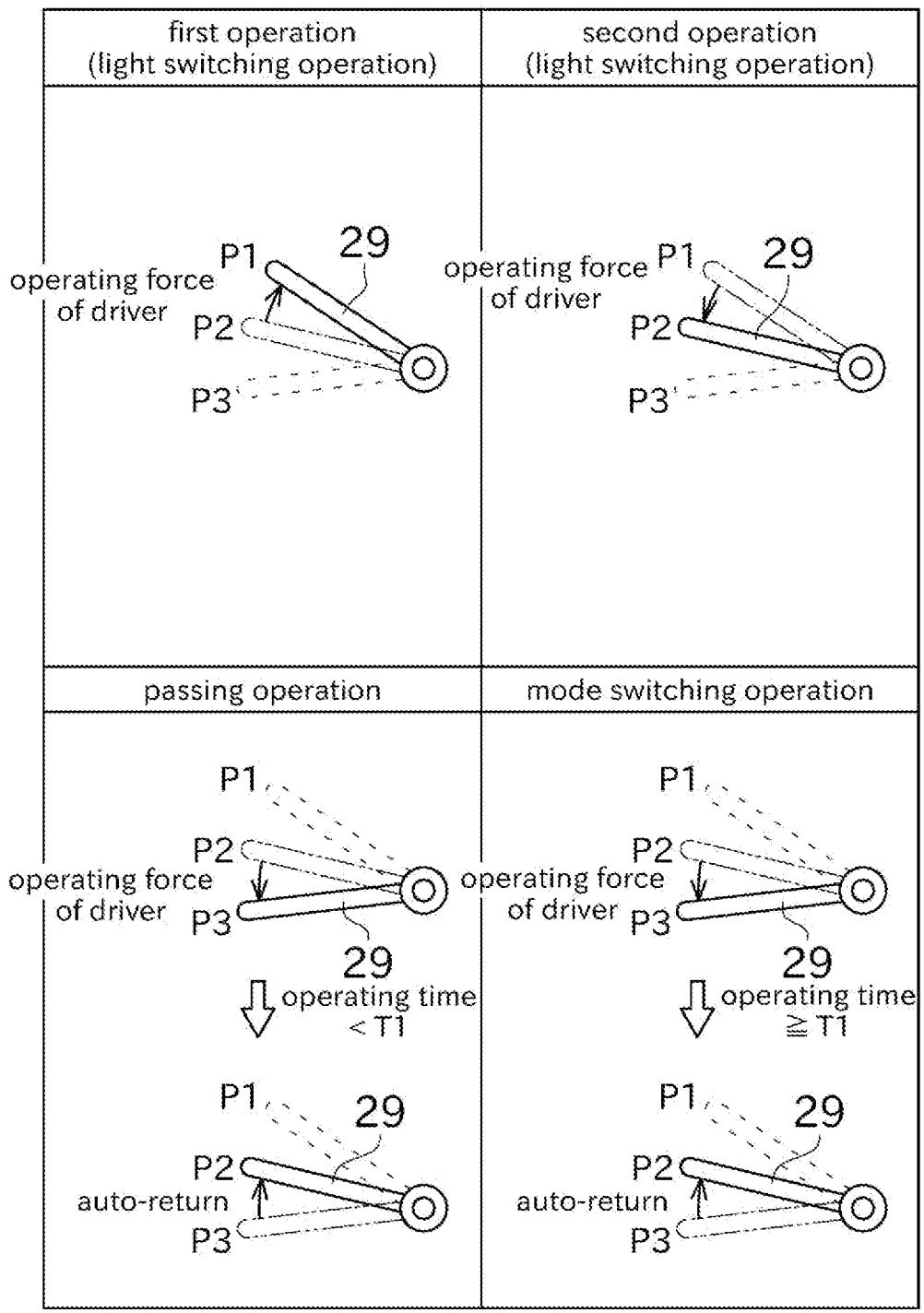
FIG. 4 is a diagram illustrating operation to be performed on a switching lever.

Next, referring to FIG. 3 or FIG. 4, modes relating to the illumination of the light 31 (in particular modes relating to the irradiation of the headlight 33) will be described. FIG. 3 is a block diagram showing an electrical configuration for changing an illumination mode of the light 31.

As shown in FIG. 3, the motorcycle 1 includes a control unit (controller) 51. The control unit 51 has a manual mode (first mode) and an automatic mode (second mode). The control unit 51 is capable of switching the current mode between the manual mode and the automatic mode. The current mode of the control unit 51 is stored in a storage device 57 provided by the control unit 51.

The control unit 51 is connected to a detection device (situation acquisition unit) 53. The detection device 53 detects a situation of the vehicle and outputs it to the control unit 51. The situation of the vehicle, which is a detection target of the detection device 53, will be described below.

The control unit 51 is provided with a computing device 55, such as a CPU, and a storage device 57, such as a flash memory. The control unit 51 can control the light 31 according to the two modes described above, and can control switching between these modes. The control unit 51 can control the light 31 according to the current mode, for example, to set the headlight 33 to high beam or low beam. The control unit 51 can send and receive information to and from each of the meter device 37 and the detection device 53, for example, by CAN communication. The control unit 51 can control the display of the meter device 37 as well as the illumination of the light 31. The control unit 51 may also be configured to perform other controls in the motorcycle 1.

The detection device 53 can detect predetermined information about the motorcycle 1 to acquire the situation of the vehicle (motorcycle 1). The detection device 53 includes a first detector 61 provided at a front part of the vehicle body 3, and a second detector 63 provided at a suitable part of the vehicle body 3. The information detected by the detection device 53 includes first information about the forward surroundings of the vehicle detected by the first detector 61 and second information about the inside of the vehicle detected by the second detector 63. The first information may include, for example, a position of a frontal object (such as a preceding vehicle, an oncoming vehicle, and a pedestrian) existing in the forward surroundings relative to the vehicle, and a brightness of the surroundings. The second information may include, for example, the vehicle speed.

In the present embodiment, the first detector 61 is a camera that acquires a forward image. The image acquired by the first detector 61 is input to the control unit 51. The control unit 51 analyzes the image obtained from the first detector 61 to recognize a situation outside the vehicle. For example, the control unit 51 can recognize the position of the preceding vehicle based on the tail light of the preceding vehicle. The first detector 61 is not limited to a camera, but can also be an ultrasonic sensor or a radar device. The first detector 61 may be a sensor that detects only brightness (light intensity) instead of an image. As the second detector 63, for example, a known vehicle speed sensor can be adopted.

The manual mode is a mode in which the driver of the motorcycle 1 changes the irradiation mode of the headlight 33 by operating (i.e., manually) the switching lever 29 of the light operation unit 27. In the manual mode, instructions based on the operation of the switching lever 29 are given to the control unit 51, and the control unit 51 sets the headlight 33 to low beam or high beam.

The automatic mode is a mode in which the control unit 51 determines the situation of the vehicle and changes (i.e., automatically) the illumination mode of the light 31. The illumination mode of the light 31 includes the irradiation mode of the headlight 33 and the irradiation mode of the cornering light 35. In the following, the irradiation mode of the headlight 33 will be described.

In the automatic mode, the control unit 51 controls to change the irradiation mode of the headlight 33 in accordance with the situation of the vehicle acquired by the detection device 53. Specifically, the control unit 51 sets the headlight 33 to low beam or high beam according to the situation of the vehicle acquired by the detection device 53. For example, at the start of running of the motorcycle 1, the control unit 51 sets the headlight 33 to low beam if the vehicle speed is less than a predetermined value (e.g., about 20 km/h), and sets it to high beam if the vehicle speed is greater than the predetermined value. In normal running, the control unit 51 sets the headlight 33 to high beam, and sets them to low beam when the control unit 51 recognizes an oncoming vehicle or a vehicle ahead, or when the control unit 51 recognizes a street light or other lighting. The conditions under which the irradiation mode of the headlight 33 is changed in the automatic mode are not particularly limited.

Next, with reference to FIGS. 3 and 4, operation performed by the driver on the switching lever 29 will be described. FIG. 4 is a diagram illustrating the operation to be performed on the switching lever 29.

The operation performed on the switching lever 29 include light switching operation, passing operation, and mode switching operation. The light switching operation is operation to switch between high beam and low beam of the headlight 33 in the manual mode. The passing operation is operation to perform passing. Passing is to temporarily (instantaneously) set the headlight 33 to high beam when the headlight 33 is in low beam. The mode switching operation is operation for switching between the manual mode and the automatic mode.

In the present embodiment, the light switching operation, the passing operation, and the mode switching operation can be performed using the switching lever 29.

As shown in FIG. 3, the switching lever 29 can be moved (can be pivoted around a base end) in the first direction or the second direction when operating force is applied. The first direction and the second direction are opposite in direction. The switching lever 29 can switch its operation position so as to move to any of the first operation position P1, the second operation position P2, and the third operation position P3.

Of the three operation positions, the second operation position P2 is between the first operation position P1 and the third operation position P3. The first operation position P1 is on the first direction side relative to the second operation position P2. The third operation position P3 is on the second direction side relative to the second operation position P2.

When the operating force on the switching lever 29 is released while the switching lever 29 is at the first operation position P1, the switching lever 29 is held at the first operation position P1. When the operating force on the switching lever 29 is released while the switching lever 29 is at the second operation position P2, the switching lever 29 is held at the second operation position P2. When the operating force on the switching lever 29 is released while the switching lever 29 is at the third operation position P3, the switching lever 29 returns to the second operation position P2.

In this embodiment, a biasing member is attached to the switching lever 29. The biasing member biases the switching lever 29 in the first direction between the second operation position P2 and the third operation position P3. The biasing member can be configured as a spring, for example. This allows the switching lever 29 to return from the third operation position P3 to the second operation position P2. Thus, the switching lever 29 is configured as a return-type operation element (retarder-type passing switch) that automatically returns from the third operation position P3 to the second operation position P2.

A switching device 65 is provided at the base end of the switching lever 29. The switching device 65 supplies (transmits) different control signals to the control unit 51 according to the operation position of the switching lever 29. Based on the supplied (received) control signal, the control unit 51 can detect which operation position the switching lever 29 is. If the current mode is the manual mode, the control unit 51 changes the irradiation mode of the headlight 33 based on the supplied state of the control signal. Specifically, in the manual mode, the control unit 51 sets the headlight 33 to high beam when the control signal is supplied from the switching device 65, and sets the headlight to low beam when the control signal is not supplied from the switching device 65.

In this embodiment, the switching device 65 includes a first switch 67 and a second switch 69. The first switch 67 and the second switch 69 can each switch a state between an ON state in which a control signal is supplied to the control unit 51 and an OFF state in which no control signal is supplied to the control unit 51, depending on the operation position of the switching lever 29. The ON state corresponds to the first state, and the OFF state corresponds to the second state. The combination of the states of the two switches in the switching device 65 expresses the three operation positions of the switching lever 29.

The respective configurations of the first switch 67 and the second switch 69 are not particularly limited. The first switch 67 and the second switch 69 may be a physical switch or a semiconductor switch, respectively.

When the switching lever 29 is at the first operation position P1 in the manual mode, the first switch 67 is in the ON state and the second switch 69 is in the OFF state, so that a control signal is supplied to the control unit 51 from the first switch 67. In this case, the control unit 51 detects that the switching lever 29 is at the first operation position P1 and sets the headlight 33 to high beam.

When the switching lever 29 is at the second operation position P2 in the manual mode, the first switch 67 is in the OFF state and the second switch 69 is in the OFF state, so that no control signal is supplied to the control unit 51 from any of the switches. In this case, the control unit 51 detects that the switching lever 29 is at the second operation position P2 and sets the headlight 33 to low beam.

When the switching lever 29 is at the third operation position P3, the first switch 67 is in the OFF state and the second switch 69 is in the ON state, so that a control signal is supplied to the control unit 51 from the second switch 69. In this case, the control unit 51 detects that the switching lever 29 is at the third operation position P3 and sets the headlight 33 to high beam.

In this manner, by switching the operation position of the switching lever 29 between the first operation position P1, the second operation position P2, and the third operation position P3, any of the light switching operation, the passing operation, and the mode switching operation can be performed. The light switching operation includes first operation for setting the headlight 33 to high beam in the manual mode and second operation for setting the headlight 33 to low beam in the manual mode, as shown in FIG. 4.

The first operation is operation to move the switching lever 29 from the second operating position P2 to the first operation position P1 by applying operating force in the first direction to the switching lever 29 at the second operation position P2. After the first operation is performed, even if the operating force is released, the switching lever 29 is held at the first operation position P1. The direction in which the switching lever 29 is moved when the first operation is performed is the first direction. The first direction is, in this embodiment, at least one of forward and upward.

The second operation is operation to move the switching lever 29 from the first operation position P1 to the second operation position P2 by applying operating force in the second direction to the switching lever 29 at the first operation position P1. After the second operation is performed, even if the operating force is released, the switching lever 29 is held at the second operation position P2. The direction in which the switching lever 29 is moved when the second operation is performed is the second direction. The second direction is, in this embodiment, at least one of backward and downward.

Since the control unit 51 can detect at which operation position the switching lever 29 is, it can determine whether or not the first operation has been performed and whether or not the second operation has been performed. If the control unit 51 determines that the first operation has been performed, the control unit 51 sets the headlight 33 to high beam in the manual mode. If the control unit 51 determines that the second operation has been performed, the control unit 51 sets the headlight 33 to low beam in the manual mode.

The passing operation is operation to move the switching lever 29 from the second operation position P2 to the third operation position P3 by applying operating force in the second direction to the switching lever 29 at the second operation position P2, and then the operating force is released before the operating time exceeds a first threshold time T1 to return the switching lever 29 to the second operation position P2. The driver may apply operating force to the switching lever 29 to return it from the third operation position P3 to the second operation position P2. In other words, the passing operation is operation to move the switching lever 29 to position it at the third operation position P3 temporarily (instantaneously).

Here, the operating time is the time that the switching lever 29 is at the third operation position P3 away from the second operation position P2. To acquire the operating time, counting of the operating time may be started at the timing when the switching lever 29 leaves the second operation position P2, or at the timing when the switching lever 29 reaches the third operation position P3.

If the control unit 51 determines that the passing operation has been performed, the control unit 51 temporarily sets the headlight 33 to high beam. Specifically, the control unit 51 sets the headlight 33 to high beam only while the switching lever 29 is at the third operation position P3. Then, when the switching lever 29 leaves the third operation position P3 (when it starts moving toward the second operation position P2), the control signal supply from the switching device 65 is stopped, and the control unit 51 sets the headlight 33 to low beam.

The mode switching operation is operation for switching the mode relating to the illumination mode of the light 31 (in particular, the irradiation mode of the headlight 33). As shown in the lower right of FIG. 4, the mode switching operation is operation to move the switching lever 29 from the second operation position P2 to the third operation position P3 by applying operating force in the second direction to the switching lever 29 at the second operation position P2, and then to hold it at the third operation position P3 until the operating time is equal to or greater than the first threshold time T1.

The control unit 51 distinguishes between the passing operation and the mode switching operation based on the difference in the operating time. Each time the control unit 51 determines that the mode switching operation has been performed, the control unit 51 switches between the manual mode and the automatic mode. In other words, when the control unit 51 determines that the mode switching operation has been performed, the control unit 51 performs a process of switching from the manual mode to the automatic mode or from the automatic mode to the manual mode, depending on the current mode.

As described above, in the motorcycle 1, a configuration that the switching lever 29 is used to perform the mode switching operation and eliminates the need for a dedicated operation member is adopted. Accordingly, the number of parts can be reduced.

When the mode is switched between the manual mode and the automatic mode, the control unit 51 performs a meter display process to change the display of the meter device 37 so that the driver can check the current mode after the switch. This process causes the display of the meter to change according to whether the current mode is the manual mode or the automatic mode. With respect to the meter display process, the meter device may display differently from each other in the manual mode and the automatic mode. Alternately, the meter device may display nothing when the current mode is the manual mode and display that the current mode is the automatic mode when the current mode is the automatic mode.

FIG. 5 shows an example of controlling the display of the meter device 37. FIG. 5 shows in tabular form the correspondence between the position of the switching lever 29 and the display of the meter device 37 in each of the manual mode and the automatic mode with respect to the irradiation mode of the headlight 33.

As shown in FIG. 5, when the current mode is the automatic mode, the control unit 51 displays an icon, for example, on the meter device 37. If the switching lever 29 is at the second operation position P2 or third operation position P3, the icon is displayed in an appearance mode D1. If the switching lever 29 is at the first operation position P1, the icon is displayed in an appearance mode D2 different from the appearance mode D1 described above. The difference between the appearance modes can be realized, for example, by differing the color, size, and emphasis of the icon. Any display can be adopted to indicate the automatic mode. For example, characters may be displayed on the meter device 37 in place of the icon. The character can be, for example, the letter "A" of the alphabet meaning automatic. A mark that combines a character and a picture can also be displayed on the meter device 37.

In the present embodiment, even in the automatic mode, the headlight 33 is automatically switched between low beam and high beam according to the vehicle situation only when the switching lever 29 is at the first operation position P1. By changing the appearance mode of the icon on the meter device 37, the driver can easily understand whether the current situation is a situation in which automatic switching between low beam and high beam can take place.

When the current mode is the manual mode, the control unit 51 does not display an icon on the meter device 37, regardless of which the position of the switching lever 29 is.

Accordingly, the driver can easily confirm whether the current mode is the automatic mode or the manual mode based on whether the icon is displayed on the meter device 37.

Figure 6:
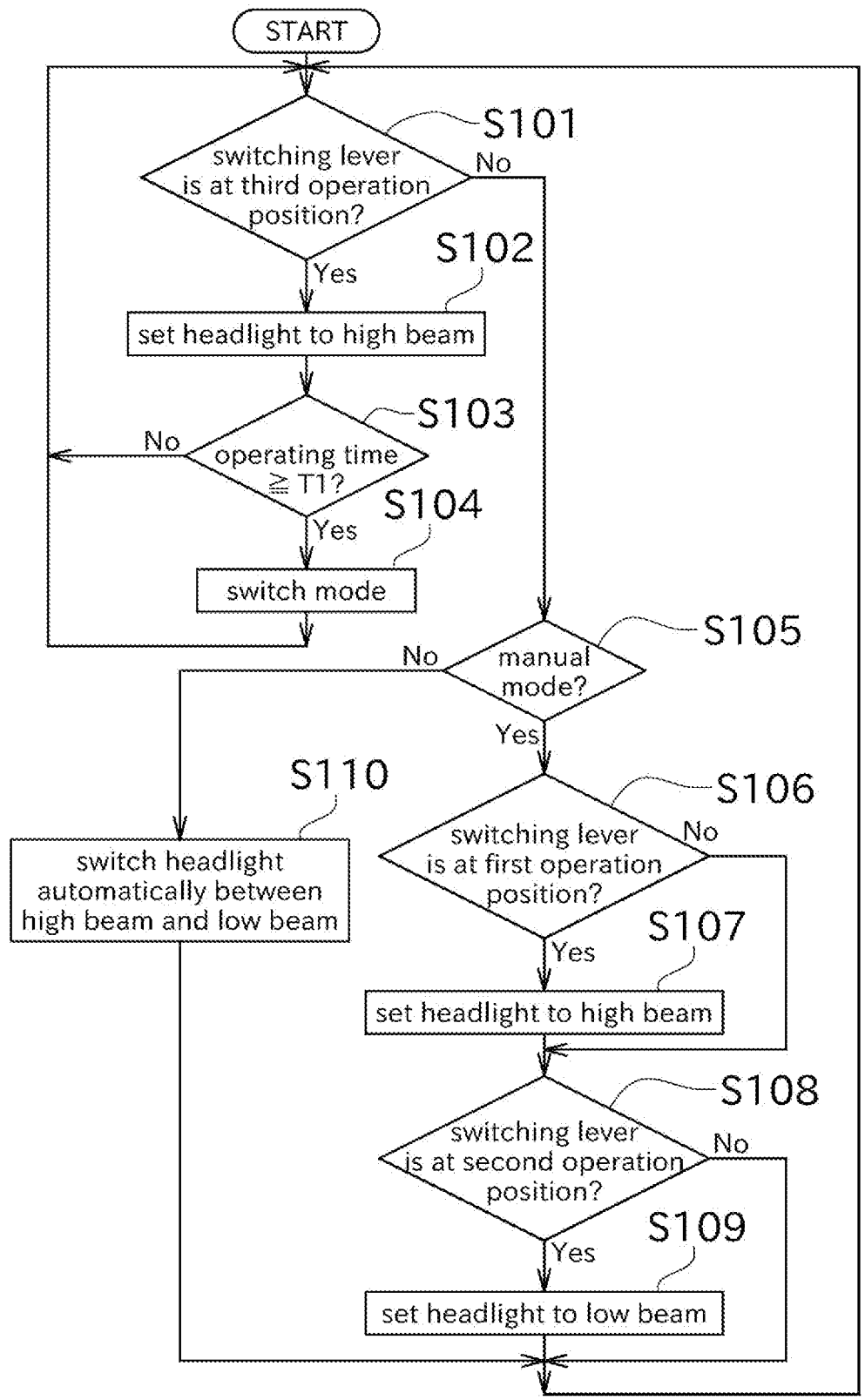
FIG. 6 is a flowchart showing a process for switching between high beam and low beam of a headlight.

Next, with reference to FIG. 6, a process (light control method) with respect to the irradiation mode of the light 31 will be described. FIG. 6 is a flowchart showing a process for switching between high beam and low beam of the headlight 33. The flowchart shown in FIG. 6 is an example, and other processing may be added, the order of processing may be changed, and some processing may be omitted.

When the process starts, the control unit 51 determines whether the switching lever 29 is at the third operation position P3 (step S101).

If it is determined that the switching lever 29 is at the third operation position P3, the control unit 51 sets the headlight 33 to high beam (step S102). Further, the control unit 51 determines whether the time from the timing at which the switching lever 29 was most recently moved from the second operation position P2 to the third operation position P3 (operating time) is equal to or greater than the first threshold time T1 (step S103, determination step). The condition used in this step S103 corresponds to a predetermined condition.

If it is determined that the operating time is equal to or greater than the first threshold time T1, the control unit 51 determines that the mode switching operation has been performed and switches the current mode to another mode (step S104, mode switching step). This causes the mode to be switched from the automatic mode to the manual mode or from the manual mode to the automatic mode. If it is determined that the operating time is not more than the first threshold time T1, the processing of step S104 is skipped. In any case, the process returns to step S101.

If, in the determination of step S101, it is determined that the switching lever 29 is not at the third operation position P3, it is determined whether the current mode is the manual mode (step S105).

If it is determined that the mode is the manual mode, the control unit 51 determines whether the switching lever 29 is at the first operation position P1 (step S106). If it is determined that the switching lever 29 is at the first operation position P1, the control unit 51 sets the headlight 33 to high beam (step S107). Next, the control unit 51 determines whether the switching lever 29 is at the second operation position P2 (step S108). If it is determined that the switching lever 29 is at the second operation position P2, the control unit 51 sets the headlight 33 to low beam (step S109). Thereby, control of the headlight 33 in the manual mode is achieved. Thereafter, the process returns to step S101.

If, in the determination of step S105, it is determined that the vehicle is not in the manual mode, the control unit 51 automatically switches the headlight 33 between low beam and high beam according to the vehicle situation (step S110). Thereby, control of the headlight 33 in the automatic mode is achieved. Thereafter, the process returns to step S101.

In the processing for this embodiment, the predetermined switching condition for switching the mode is that the operating time of the switching lever 29 to the third operation position P3 is equal to or greater than the first threshold time T1 (long pressing operation of the switching lever 29 in the second direction). However, in such a process, the switching condition may be that the switching lever 29 is moved to the third operation position a plurality of times within a predetermined time range, or that an operation element different from the switching lever 29 is operated.

The current mode of the control unit 51 is stored non-volatile to the storage device 57. When the ignition switch, not shown, is turned OFF and then ON again, the control unit 51 operates in the same mode as before the ignition switch was turned OFF.

Next, the occurrence of an abnormal state regarding the switching lever 29 and the switching device 65 will be described.

No matter in which of the three operation positions the switching lever 29 is in, the number of switches among the first switch 67 and the second switch 69 that are turned ON to supply control signals is equal to or less than one. In other words, a situation in which both of the two switches are in the ON state does not occur. Therefore, if a control signal is supplied from both of the two switches at the same time, it means that some abnormality has occurred in one of the switches.

Therefore, when the control signal from the first switch 67 and the control signal from the second switch 69 are detected simultaneously, the control unit 51 determines that an abnormality has occurred. In other words, when the control unit 51 simultaneously detects the control signal supplied when the switching lever 29 is at the first operation position P1 and the control signal supplied when the switching lever 29 is at the third operation position P3, the control unit 51 determines that the current state with respect to the switching lever 29 and the switching device 65 is an abnormal state.

When the control unit 51 determines that the current state is an abnormal state, the control unit 51 performs a process such as informing the driver of the occurrence of the abnormal state. This processing is not particularly limited. For example, the control unit 51 can cause the meter device 37 to display a message that an abnormal state relating to the light operation unit 27 (switching lever 29) has occurred.

When the control unit 51 determines that the current state is the abnormal state, the control unit 51 is switched to an abnormality handling mode. In the abnormality handling mode, the control unit 51 controls the headlight 33 to be forcibly set to low beam. Thereafter, the control unit 51 controls the headlight 33 to be kept on low beam regardless of the operation position of the switching lever 29 (in other words, regardless of the presence or absence of the control signals from the two switches). In the abnormality handling mode, the control unit 51 does not change the headlight 33 from its low beam state, no matter to which operation position the switching lever 29 is moved.

Therefore, when the control unit 51 determines that the current state is the abnormal state, the state in which the headlight 33 is set to low beam is fixed. Accordingly, illusions to oncoming vehicles and the like can be reduced.

When the control unit 51 determines that the current state is the abnormal state, it stores in the storage device 57 that the abnormal state has occurred. For example, a predetermined code, which indicates that there was an abnormality in the switch of the switching device 65, may be stored as an abnormality history. The stored contents of the storage device 57 can be acquired later in a suitable manner to be utilized for investigating the cause of the abnormal state, etc.

After entering the abnormality handling mode, the situation in which the control signal from the first switch 67 and the control signal from the second switch 69 are simultaneously detected may be eliminated for some reason. However, as long as an apparently abnormal state has been detected in the past, it is preferable to be cautious about trusting the operation of the switch or the like even if the state is resolved. Therefore, the control unit 51 does not cancel the abnormality handling mode and continues to maintain the low beam. The abnormality handling mode is canceled when special operation (e.g., turning the ignition switch, which is not shown, OFF once and then ON again) is performed and no abnormality is detected at that time.

Figure 7:
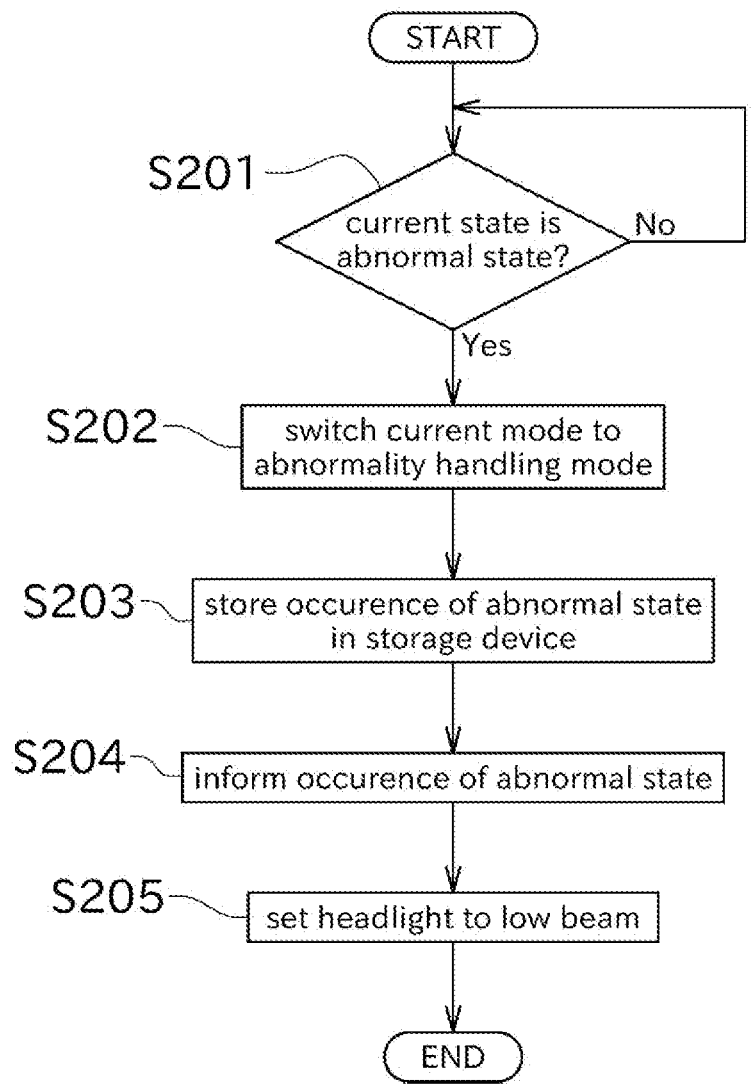
FIG. 7 is a flowchart illustrating a process for an occurrence of an abnormal state.

Next, referring to FIG. 7, the flow of processing regarding the occurrence of the abnormal state will be described. FIG. 7 is a flowchart of processing concerning the occurrence of the abnormal state. The flowchart shown in FIG. 7 is an example, and other processing may be added, the order of processing may be changed, and some processing may be omitted.

The control unit 51 determines whether the current state is the abnormal state (step S201). In this embodiment, the control unit 51 makes a determination based on whether a control signal supplied when the switching lever 29 is at the first operation position P1 and a control signal supplied when the switching lever 29 is at the third operation position P3 are detected simultaneously.

If it is determined that the current state is the abnormal state, the control unit 51 switches the current mode to the abnormality handling mode (step S202). The control unit 51 stores the occurrence of the abnormal state in the storage device 57 (step S203). The control unit 51 informs the driver of the occurrence of the abnormal state (step S204). The method for providing the notification is not particularly limited, and for example, a meter display by the meter device 37 can be adopted. The control unit 51 forcibly keeps the headlight 33 on low beam regardless of whether or not a control signal is supplied from each of the first switch 67 and the second switch 69 (step S205).

As described above, the motorcycle (straddle vehicle) 1 of the present embodiment includes the light 31, the detection unit (situation acquisition unit) 53, the control unit (control unit) 51, and the switching lever (operation member) 29. The light 31 includes the headlight 33. The detection unit 53 acquires a situation of the motorcycle 1. The control unit 51 performs control related to illumination by the light 31. The switching lever 29 is operable to indicate the optical axis angle of the headlight 33. The switching lever 29 is operable to switch the operating position between the first operation position P1, the second operation position P2, and the third operation position P3. When operating force on the switching lever 29 is released while the switching lever 29 is at the first operation position P1, the switching lever 29 is held at the first operation position P1. When operating force on the switching lever 29 is released while the switching lever 29 is in the second operation position P2, the switching lever 29 is held at the second operation position P2. When operating force on the switching lever 29 is released while the switching lever 29 is at the third operation position P3, the switching lever 29 returns to the second operation position P2. The control unit 51 can switch between the manual mode (first mode) and the automatic mode (second mode). In the manual mode, the control unit 51 sets the headlight 33 to high beam when the switching lever 29 is at any of the first operation position P1 and the third operation position P3, and sets the headlight 33 to low beam when the switching lever 29 is at the second operation position P2. In the automatic mode, the control unit 51 controls to change the illumination mode by the light 31 according to the situation acquired by the detection unit 53. Switching from the manual mode to the automatic mode is performed by holding the switching lever 29 at the third operation position P3 for the first threshold time T1 or more.

As a result, a simple switching lever 29 having three operation positions can be used to instruct the control unit 51 to switch from the manual mode to the automatic mode by simple operation of holding the switching lever 29 at the third operation position P3 for the predetermined time. This is suitable for a straddle vehicle in which simplicity of operation is strongly required.

In this embodiment of the motorcycle 1, in the automatic mode, the control unit 51 controls the headlight 33 to change the irradiation mode of the headlight 33 according to the situation acquired by the detection unit 53.

This simplifies the switching of the irradiation mode of the headlight 33.

In this motorcycle 1, the control unit 51 is configured to set the headlight 33 to high beam when the control signal is supplied (when the control signal is received) and to set the headlight to low beam when no control signal is supplied. The motorcycle 1 is provided with the switching device 65. The switching device 65 enters a state in which the control signal is supplied to the control unit 51 when the switching lever 29 is at the first operation position P1, and enters a state in which no control signal is supplied to the control unit 51 when the switching lever 29 is at the second operation position P2.

With this configuration, when the electric circuit related to the switching device 65 is snapped, the state in which the headlight 33 is set to low beam is fixed in the manual mode. Accordingly, even when the switching of the irradiation mode cannot be controlled due to the snap of the electric circuit, the illusions to the passenger or the like of the oncoming vehicle can be reduced.

In the motorcycle 1 of this embodiment, the switching device 65 enters a state in which a control signal is supplied to the control unit 51 when the switching lever 29 is at the third operation position P3.

Consider a configuration that, in the manual mode, the headlight is configured to be set to high beam on the condition that the control signal is supplied from the switching device 65 to the control unit 51. In this configuration, if the electric circuit is broken with respect to the switching device 65, the state in which the headlight 33 is set to low beam will be fixed in the manual mode. Accordingly, even when the electric circuit is snapped and the switching of the irradiation mode cannot be controlled, it is possible to reduce the illusions to a passenger of an oncoming vehicle and the like.

In the motorcycle 1 of this embodiment, the control unit 51 determines that the current state is an abnormal state when the control signal supplied when the switching lever 29 is at the first operation position P1 and the control signal supplied when the switching lever 29 is at the third operation position P3 are detected simultaneously.

A situation in which two control signals are simultaneously supplied to the control unit 51 indicates some abnormality. The abnormality is, for example, a short circuit in the control signal cable. The control unit 51 determines that the current state is an abnormal state by detecting the two control signals. Therefore, the control unit 51 can take appropriate action, such as informing the driver of the occurrence of the abnormality.

In the motorcycle 1 of the present embodiment, when the control unit 51 determines that the current state is an abnormal state, the control unit 51 executes the abnormality handling mode. In the abnormality handling mode, the control unit 51 sets the headlight 33 to low beam and controls the headlight 33 to be kept on low beam regardless of the operation of the switching lever 29.

When an abnormality occurs in the switching device 65, the headlight 33 is maintained in low beam. Accordingly, illusions to a passenger of an oncoming vehicle and the like can be reduced.

In the motorcycle 1 of the present embodiment, when the control unit 51 determines that the current state is the abnormal state, the control unit 51 stores in the storage device 57 that the abnormal state has occurred.

As a result, the contents stored in the storage device 57 can be acquired in a suitable manner and utilized for investigating the cause of the abnormality and the like.

In the motorcycle 1 of the present embodiment, the control unit 51 causes the display on the meter to differ depending on whether the vehicle is in the manual mode or the automatic mode.

This allows the driver to understand whether the current mode is the manual mode or the automatic mode by looking at the meter device 37.

In this light control method for a motorcycle 1, the motorcycle 1 includes the switching lever 29 (retarder-type passing switch). This light control method includes the determination step and the mode switching step. In the determination step, it is determined whether the predetermined switching condition including operation of the switching lever 29 is satisfied. In the mode switching step, the mode set for the light 31 is switched according to the determination result of the determination step.

In this way, the mode set for the light can be switched. And, the configuration for switching the mode can be simplified.

The abnormality handling mode shown in the above embodiments can be implemented, for example, in the following cases.

That is, if the second switch 69 is in the ON state for a second threshold time or longer, the control unit 51 can also determine that an abnormality has occurred in the second switch 69 and the current state is the abnormal state. In such a case, the control unit 51 can execute the abnormality handling mode.

When the control signal is input for the second threshold time or longer, the control unit 51 determines that an abnormality related to the second switch 69 has occurred. The length of the second threshold time is arbitrary, as long as it exceeds the first threshold time. However, it is preferable that the second threshold time is set to be long enough that it cannot be assumed that the mode switching operation has been performed. For example, the second threshold time may be set to 10 times or more than the first threshold time.

Since the third operation position P3 is a position for performing the passing operation and for performing the mode switching operation, it is unlikely that the switching lever 29 is held at the third operation position P3 for a long time. Therefore, when the ON state of the second switch 69 is detected continuously for the second threshold time or longer, the control unit 51 can take an appropriate action, such as informing the driver that the current state is an abnormal state, in the same manner as described above.

In the abnormality handling mode due to the second switch 69 having been in the ON state for the second threshold time or longer, the control unit 51 controls the headlight 33 to be forcibly set to low beam. Thereafter, the control unit 51 controls the headlight 33 to be kept on low beam regardless of whether or not the control signal is supplied from the first switch 67.

Although there is no abnormality in the second switch 69, there may be a case in which the driver continues to operate the switching lever 29 at the third operation position P3 for a considerable length of time, and thus the system enters the abnormality handling mode. In this case, the driver would stop operating the switching lever 29, which would cause the switching lever 29 to return to the second operation position P2. In the abnormality handling mode due to the second switch 69 having been in the ON state for the second threshold time or longer, when the OFF state of the second switch 69 is detected, the control unit 51 automatically cancels the abnormality handling mode. The control unit 51 sets the current mode as the mode (manual mode or automatic mode) immediately before the abnormality handling mode was started.

Thus, when the second switch 69, which had been in the ON state for the second threshold time or longer, changes to the OFF state, it is considered that no abnormality has actually occurred in the second switch 69, and that the switching lever 29 was merely returned to the second operation position P2 after being held at the third operation position P3 by the driver for a long time. In this case, the control unit 51 cancels the abnormality handling mode. This avoids a decrease in convenience for the driver.

Although the preferred embodiment and the modifications of the present disclosure have been described above, the configurations described above may be modified as follows, for example.

In the motorcycle 1, when the automatic mode is executed, the illumination mode of the light 31 is changed by the control unit 51. In the above embodiment, a change in the irradiation mode of the headlight 33 is described as an example of a change in the illumination mode of the light 31. However, the change in the illumination mode of the light 31 may include a change in the irradiation mode of the cornering light 35.

An ADB (Adaptive Driving Beam) may be used as the headlight provided with the motorcycle 1. In this configuration, when the control unit 51 is in the automatic mode and detects a frontal object such as a preceding vehicle with a camera for example, the control unit 51 can control to reduce the light intensity of the headlight 33 toward the frontal object. In this case, it is possible to make it difficult to dazzle a passenger of an oncoming vehicle or a driving vehicle, or a pedestrian in the forward surroundings of the vehicle.

In the motorcycle 1, the headlight 33 is always on. Some drivers may wish to change the mode relating to the irradiation mode of the headlight 33 during the daytime and after sunset. For this reason, the control unit 51 may, for example, based on at least one of the time of day and the brightness of the surroundings, cause a predetermined mode to be executed when it can be identified that it is daytime, and cause another predetermined mode to be executed when it can be identified that it is after sunset.

The motorcycle 1 performs a turn by inclining the vehicle body 3 inwardly in the turning direction. As the vehicle body 3 leans, the height of the headlight 33 is lowered and the direction of the headlight 33 is also changed. Therefore, the irradiation range (irradiation distance and horizontal spread) of the light of the headlight 33 also changes in accordance with the lean angle of the vehicle body 3. Accordingly, the control unit 51 may use the lean angle of the motorcycle 1 in determining the irradiation mode of the headlight 33 in the automatic mode. The lean angle of the motorcycle 1 is, in detail, a tilt angle of the motorcycle 1 with the front-rear direction as the rotation axis direction (so-called bank angle). This lean angle can be detected, for example, by an inclination sensor provided with the motorcycle 1.

The shape and configuration of the switching lever 29 of the above embodiment is an example and can be changed as desired. For example, the switching lever 29 may be an operation element which has two pressing points and one pressing point may be a return type button.

The control unit 51 may be configured to have a second automatic mode in which the control sensitivity is changed so that a situation in which the head light is set to low beam occurs more frequently than in the aforementioned automatic mode. By operation different from the aforementioned automatic mode (e.g., combined operation of the switching lever 29 and the ignition switch), the control unit 51 is switched to the second automatic mode. It is preferred that the display of the meter device 37 differs between the second automatic mode and the automatic mode. As an example, when the control unit 51 is in the second automatic mode, long pressing operation of the switching lever 29 to the third operation position P3 switches the control unit 51 to the manual mode. When the ignition switch is turned OFF and then turned ON again while the control unit 51 is in the second automatic mode, the control unit 51 is switched to the manual mode.

The control unit 51 can be configured to be switched to the abnormality handling mode by a communication failure such as CAN communication, a hardware failure, a temperature abnormality, a blocked field of view of the camera as the first detector 61, or the like. In this case, as an example, the control unit 51 is switched from the abnormality handling mode to the manual mode by some operation being performed on the switching lever 29. When the ignition switch is turned OFF and then turned ON again, the control unit 51 is switched from the abnormality handling mode to the manual mode.

The function of the control unit 51 to control the light 31 can also be realized by a control computer of other hardware (e.g., a camera that is the first detector 61 of the detection unit 53).

In the above embodiment, a motorcycle 1 is mentioned as an example of a straddle vehicle, but the present disclosure can be applied to another vehicle. For example, another vehicle can be a vehicle having three wheels instead of two.

In view of the foregoing teachings, it is apparent that the present disclosure may take many modified and variant forms. Accordingly, it is to be understood that the present disclosure may be practiced in ways other than those described herein within the scope of the appended claims.

DESCRIPTION OF THE REFERENCE NUMERALS 1 motorcycle (straddle vehicle)
29 switching lever (operation member)
31 light
33 headlight
51 control unit (controller)
53 detection device (situation acquisition unit)
65 switching device
P1 first operation position
P2 second operation position
P3 third operation position

The invention claimed is:

1. A straddle vehicle, comprising:
a light having a headlight;
a situation acquisition unit acquiring situation of the vehicle;
a controller controlling illumination by the light; and
an operation member operable to indicate an optical axis angle of the headlight,
wherein the operation member is switchable between a first operation position, a second operation position, and a third operation position,
wherein when operating force is released while the operation member is at the first operation position, the operation member is held at the first operation position,
wherein when operating force is released while the operation member is at the second operation position, the operation member is held at the second operation position,
wherein when operating force is released while the operation member is at the third operation position, the operation member returns to the second operation position,
wherein the controller is switchable between a first mode and a second mode,
wherein in the first mode, the controller sets the headlight to high beam when the operation member is at any of the first operation position and the third operation position, and sets the headlight to low beam when the operation member is at the second operation position,
wherein in the second mode, the controller controls to change an illumination mode by the light according to the situation acquired by the situation acquisition unit, and the switching from the first mode to the second mode is performed by holding the operation member at the third operation position for a first threshold time or more, and;
wherein the operation member functions as a passing switch.

2. The straddle vehicle according to claim 1, wherein in the second mode, the controller controls the headlight to change an irradiation mode of the headlight according to the situation acquired by the situation acquisition unit.

3. The straddle vehicle according to claim 1, wherein the situation of the vehicle acquired by the situation acquisition unit includes information indicating a frontal object existing in a forward surroundings to the vehicle and wherein in the second mode, the controller controls to reduce a light intensity of the light toward the frontal object corresponding to the information acquired by the situation acquisition unit.

4. The straddle vehicle according to claim 1, wherein the controller is configured to set the headlight to high beam when a control signal is supplied, and to set the headlight to low beam when no control signal is supplied, wherein the straddle vehicle includes a switching device, wherein the switching device enters a state in which a control signal is supplied to the controller when the operation member is at the first operation position, and the switching device enters a state in which a control signal is not supplied to the controller when the operation member is at the second operation position.

5. The straddle vehicle according to claim 4, wherein the switching device enters a state in which a control signal is supplied to the controller when the operation member is at the third operation position.

6. The straddle vehicle according to claim 5, wherein the controller determines that a current state is an abnormal state when the control signal supplied when the operation member is at the first operation position and the control signal supplied when the operation member is at the third operation position are detected simultaneously.

7. The straddle vehicle according to claim 6, wherein when the controller determines that the current state is the abnormal state, the controller executes an abnormality handling mode and wherein in the abnormality handling mode, the controller sets the headlight to low beam and controls the headlight to be kept on low beam regardless of the operation of the operation member.

8. The straddle vehicle according to claim 6, wherein when the controller determines that the current state is the abnormal state, the controller stores in a storage device that the abnormal state has occurred.

9. The straddle vehicle according to claim 1, wherein the controller causes a meter display to differ according to whether the vehicle is in the first mode or the second mode.

10. The straddle vehicle according to claim 1, wherein the second operation position is between the first operation position and the third operation position.

11. The straddle vehicle according to claim 1, wherein, when the operation member is held at the third operation position for a time less than the first threshold time, the controller remains in the first mode, and wherein, when the operation member is held at the third operation position for a time greater than or equal to the first threshold time, the controller switches from the first mode to the second mode.

* * * * *